United States Patent
Vaughan et al.

(10) Patent No.: US 7,522,730 B2
(45) Date of Patent: Apr. 21, 2009

(54) UNIVERSAL MICROPHONE FOR SECURE RADIO COMMUNICATION

(75) Inventors: John Vaughan, Pepperell, MA (US); Dennis Michael Martinez, Westford, MA (US)

(73) Assignee: M/A-Com, Inc., Lowell, MA (US)

( * ) Notice: Subject to any disclaimer, the term of this patent is extended or adjusted under 35 U.S.C. 154(b) by 777 days.

(21) Appl. No.: 10/824,174

(22) Filed: Apr. 14, 2004

(65) Prior Publication Data
US 2005/0235147 A1    Oct. 20, 2005

(51) Int. Cl.
*H04L 9/00* (2006.01)
(52) U.S. Cl. ............................ 380/275; 380/270
(58) Field of Classification Search ............ 380/255, 380/270, 275
See application file for complete search history.

(56) References Cited

U.S. PATENT DOCUMENTS

| | | | | |
|---|---|---|---|---|
| 4,134,070 | A * | 1/1979 | Henderson et al. | 455/90.3 |
| 5,150,401 | A * | 9/1992 | Ashby et al. | 380/29 |
| 5,185,797 | A * | 2/1993 | Barrett et al. | 380/274 |
| 6,131,084 | A * | 10/2000 | Hardwick | 704/230 |
| 6,266,418 | B1 * | 7/2001 | Carter et al. | 380/257 |
| 6,366,117 | B1 * | 4/2002 | Pang et al. | 326/38 |
| 6,553,228 | B1 * | 4/2003 | Kotzin | 455/434 |
| 2001/0018635 | A1 * | 8/2001 | Miyasaka et al. | 701/200 |
| 2002/0080966 | A1 | 6/2002 | Blanchard et al. | 380/270 |
| 2003/0026170 | A1 * | 2/2003 | Yang | 368/10 |
| 2004/0076303 | A1 * | 4/2004 | Vyshedskly et al. | 381/67 |
| 2006/0198520 | A1 * | 9/2006 | Courtney et al. | 380/247 |

FOREIGN PATENT DOCUMENTS

| | | |
|---|---|---|
| DE | 198 47 374 | 4/2000 |
| EP | 0 818 937 | 1/1998 |
| GB | 2 388 279 | 11/2003 |

OTHER PUBLICATIONS

Search Report dated Jun. 4, 2006 from corresponding European Application No. 05102928.8-2413.

* cited by examiner

*Primary Examiner*—Gilberto Barron, Jr.
*Assistant Examiner*—Cordelia Kane

(57) ABSTRACT

A microphone unit comprising a voice input for receiving a voice input signal, an analog to digital converter for creating a digital signal from voice signal, a voice coding device for creating a voice coded signal output from the digital signal, encryption means for encrypting the voice coded signal, and a modulator for generating a transmittable signal that can be supplied to a radio via the microphone input. Additionally, the microphone unit is capable of performing the steps in reverse upon receiving an encrypted signal. The received signal output from the radio is demodulated, un-encrypted, voice decoded, converted from a digital voice signal to an analog voice signal, and output via a speaker which is preferably built into the microphone unit.

22 Claims, 5 Drawing Sheets

UNIVERSAL MICROPHONE FOR SECURE RADIO COMMUNICATION

FIELD OF THE INVENTION

The present invention relates to wireless communication systems, and more specifically, to a method and apparatus for ensuring secure communications between wireless radios.

BACKGROUND OF THE INVENTION

Ensuring security in wireless communications has become a growing concern in recent times. Two way wireless communication is used extensively today by a wide variety of users. Police personnel, fire personnel, military personnel, commercial organizations, and ordinary citizens all often utilize two-way radios for communication. Traditionally, such communications were not secure, i.e., anyone with a radio or scanner on the communication frequency could receive and understand the communications. In today's environment, however, a much greater need exists for secure communications in areas where unsecure transmissions were previously sufficient.

In the past, secure transmission systems in the past generally were limited to systems involving high levels of national security. To achieve secure transmissions, encryption techniques are used in high end systems. These techniques involve scrambling a signal (either digital or analog) upon transmission, and then unscrambling the signal upon reception.

The need to add encryption to everyday systems, however, presents a new set of concerns. Currently, in order to make communications secure, two options are available. First, an entirely new system can be installed that contains encryption technology built into each radio, similar to the high end systems used previously in applications involving national security. The problem, however, is that this approach requires replacing all of the existing hardware currently being used. All existing systems and radios would become obsolete. Because of this limitation, this solution is extremely expensive and cost prohibitive in many cases.

A second, less commonly used option is to install a new component in existing radios to provide encryption. This approach also has significant limitations. Any currently existing encryption components have been designed for specific brands and models of radios. Thus, this retrofit approach is limited in the types of radios to which it can be applied. Furthermore, this approach is costly in that even after the encryption components have been purchased, each radio must be disassembled, the encryption component installed, and the radio reassembled. As a result, this technique has limited practical application.

What is desired is to a system to provide secure transmissions in environments that were traditionally not secure. It is further desired to create secure transmissions in a cost effective manner, using existing radio equipment. This invention fulfills these desires, among others.

SUMMARY OF THE INVENTION

The present invention provides a system, method, and apparatus for achieving secure wireless communications. The present invention allows for security to be obtained using existing wireless radios operating on existing communication systems. In accordance with the present invention, an encryption function is incorporated into a microphone unit capable of operating with existing radio equipment. The microphone unit in accordance with the present invention encrypts the signal created from the user's voice and provides it to a radio in the same signal format that the radio would normally receive un-encrypted voice signals. In this manner, encryption can be provided using existing radios through existing microphone inputs, thus eliminating the need for costly new systems or costly modifications to existing systems.

In a preferred embodiment, the microphone for receiving a voice signal, an analog to digital converter for creating a digital signal from the voice signal, a voice coding device for creating a voice coded signal from the digital signal, encryption means for encrypting the voice coded signal, and a modulator for generating a transmittable signal that can be supplied to a radio via the microphone input.

Additionally, the microphone unit is capable of performing the steps in reverse upon receiving an encrypted signal. The received signal output from the radio is demodulated, un-encrypted, voice decoded, converted from a digital voice signal to an analog voice signal, and output via a speaker which is preferably built into the microphone unit.

DETAILED DESCRIPTION OF THE INVENTION

Figure 1:
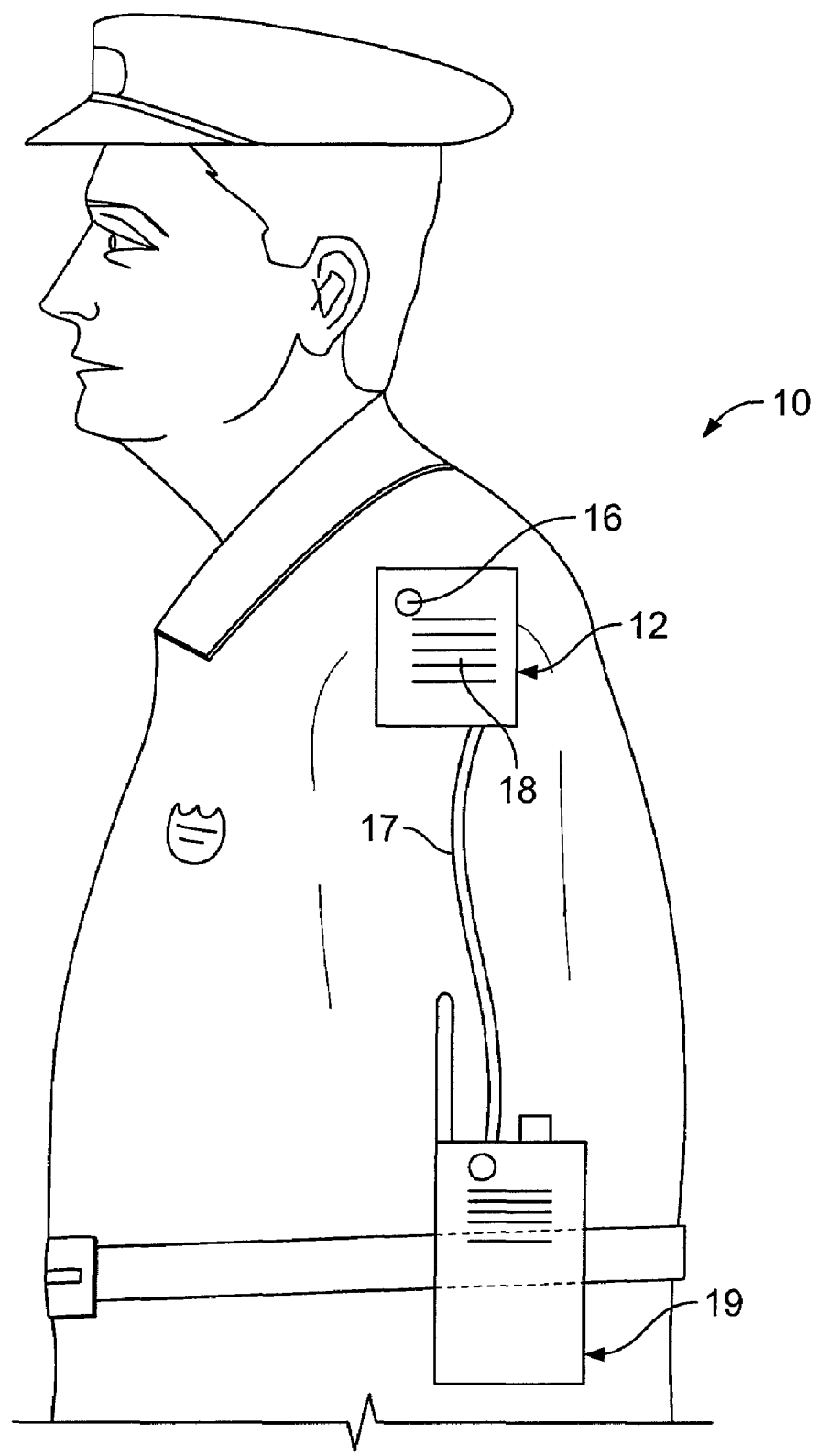
FIG. 1 is a diagram illustrating an exemplary environment of a two way radios in use.

FIG. 1 illustrates an exemplary environment in which a microphone unit in accordance with the present invention can operate. A two way radio is shown in one of the more common configurations, that is, configured for use by public safety personnel (e.g., police officers, fire personnel). A lapel or shoulder mounted microphone unit 12 is worn on the shoulder of the user. The microphone unit 12 is connect via a cable 17 to the main radio unit 19, which is typically worn on the belt of the user. The main radio unit 19 commonly used by police personnel is a two way radio operating on the UHF band. It is, however, understood that the present invention can be used in conjunction with many types of radios and is not limited to the radio type in the exemplary embodiment.

The microphone unit 12 shown on the officer's shoulder is typically a push to talk (PTT) type unit. A PTT button 16 resides on the microphone unit 12 which the officer depresses in order to activate the microphone in a transmit mode. When the PTT button 16 is not depressed, the microphone unit resides in a receiving mode, whereby incoming communications are broadcast via a speaker 18 contained in the microphone unit 12.

The shoulder worn microphone unit 12 is connected to the main radio unit 19 via a cable 17. The main radio unit 19 can be any type of two way radio unit capable of receiving a microphone input.

Figure 2A:
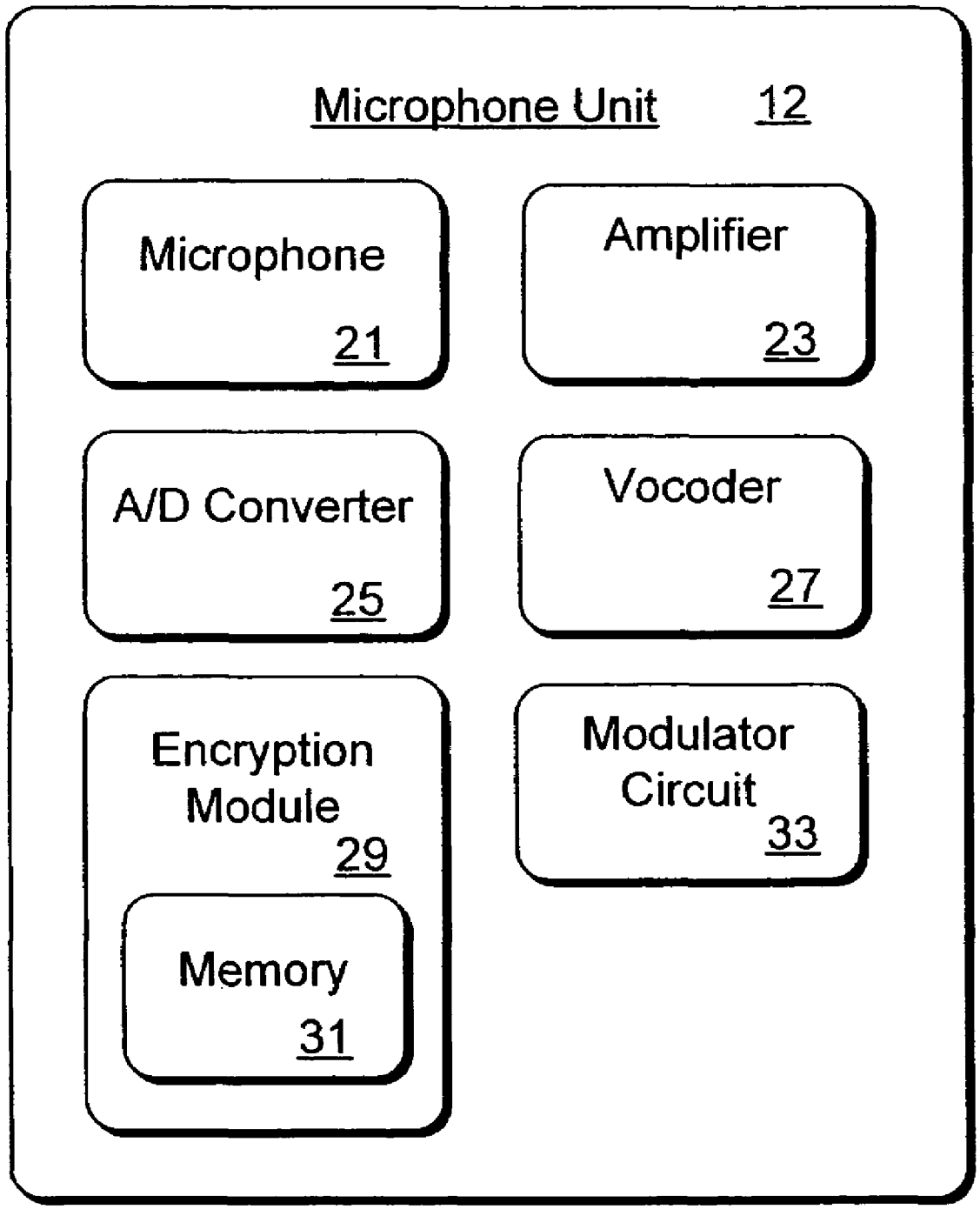
FIG. 2a is a block diagram illustrating the various components of a microphone unit used for transmitting secure communications in accordance with the present invention.

The microphone unit 12 in accordance with the present invention shall now be described in detail with reference to FIGS. 2a, 2b, 3a, and 3b. In FIGS. 2a and 3a, block diagrams are used to illustrate the various components of an exemplary microphone unit 12 that can be utilized to implement the inventive techniques in accordance with the present invention. FIG. 2a illustrates the components used to transmit an encrypted signal, while FIG. 3a illustrates the components used to receive an encrypted signal. It should, however, be understood that, in a preferred embodiment, certain components can be used for both processes. For clarity, separate components are shown in FIGS. 2a and 3a.

Figure 2B:
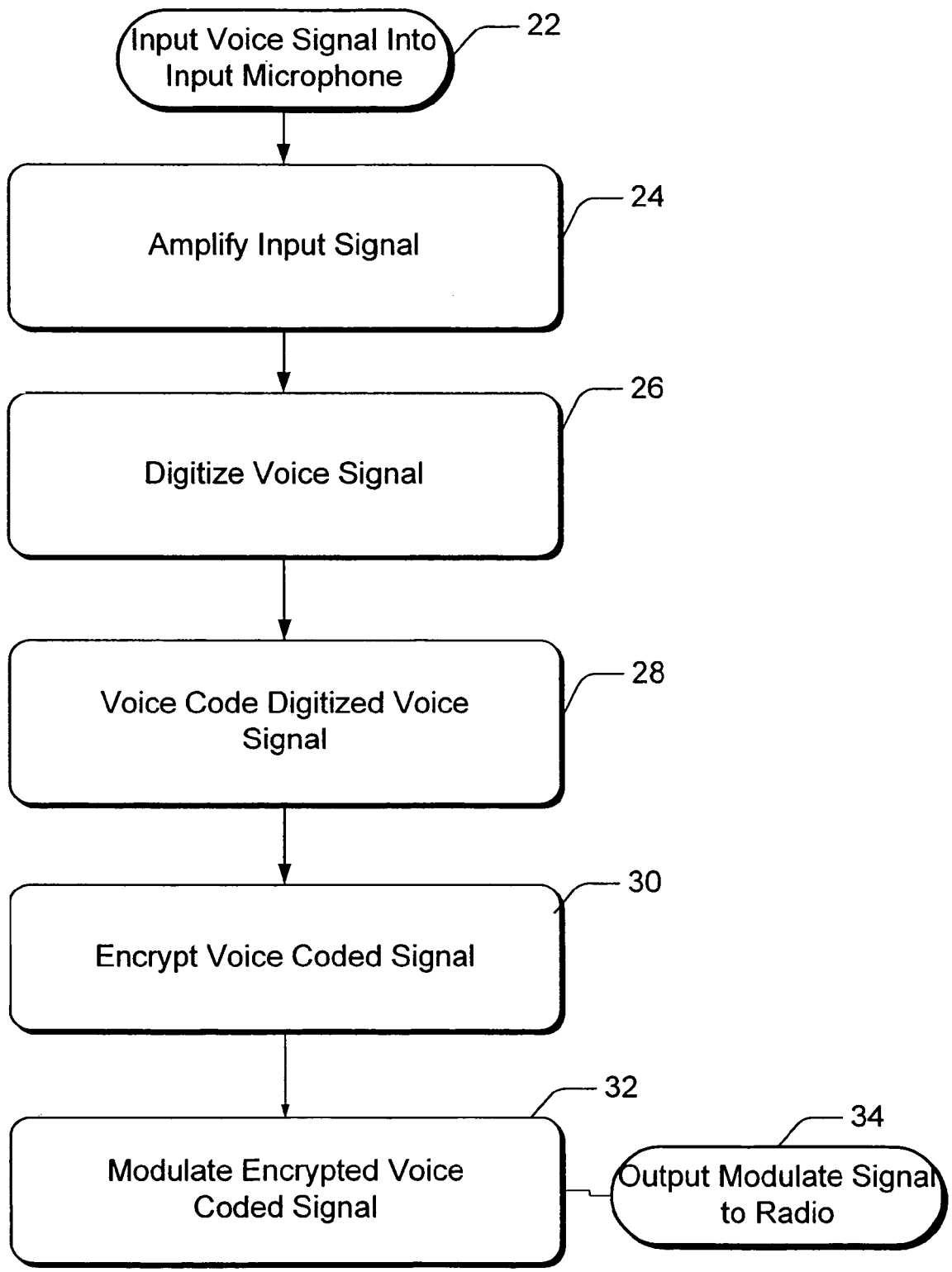
FIG. 2b is a flow diagram illustrating the method of creating secure communications in accordance with the present invention.
Figure 3A:
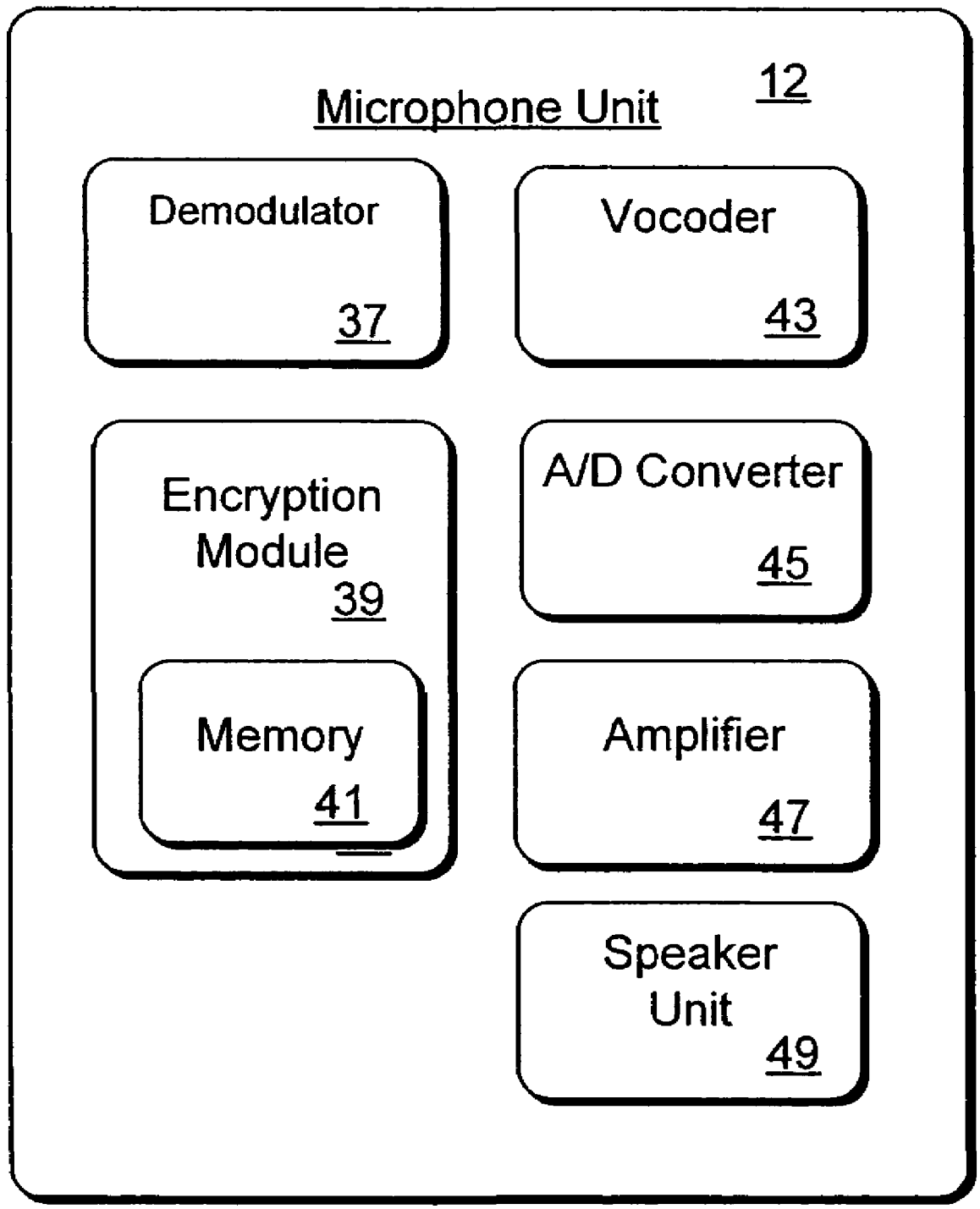
FIG. 3a is a block diagram illustrating the various components of a microphone unit used for receiving secure communications in accordance with the present invention.
Figure 3B:
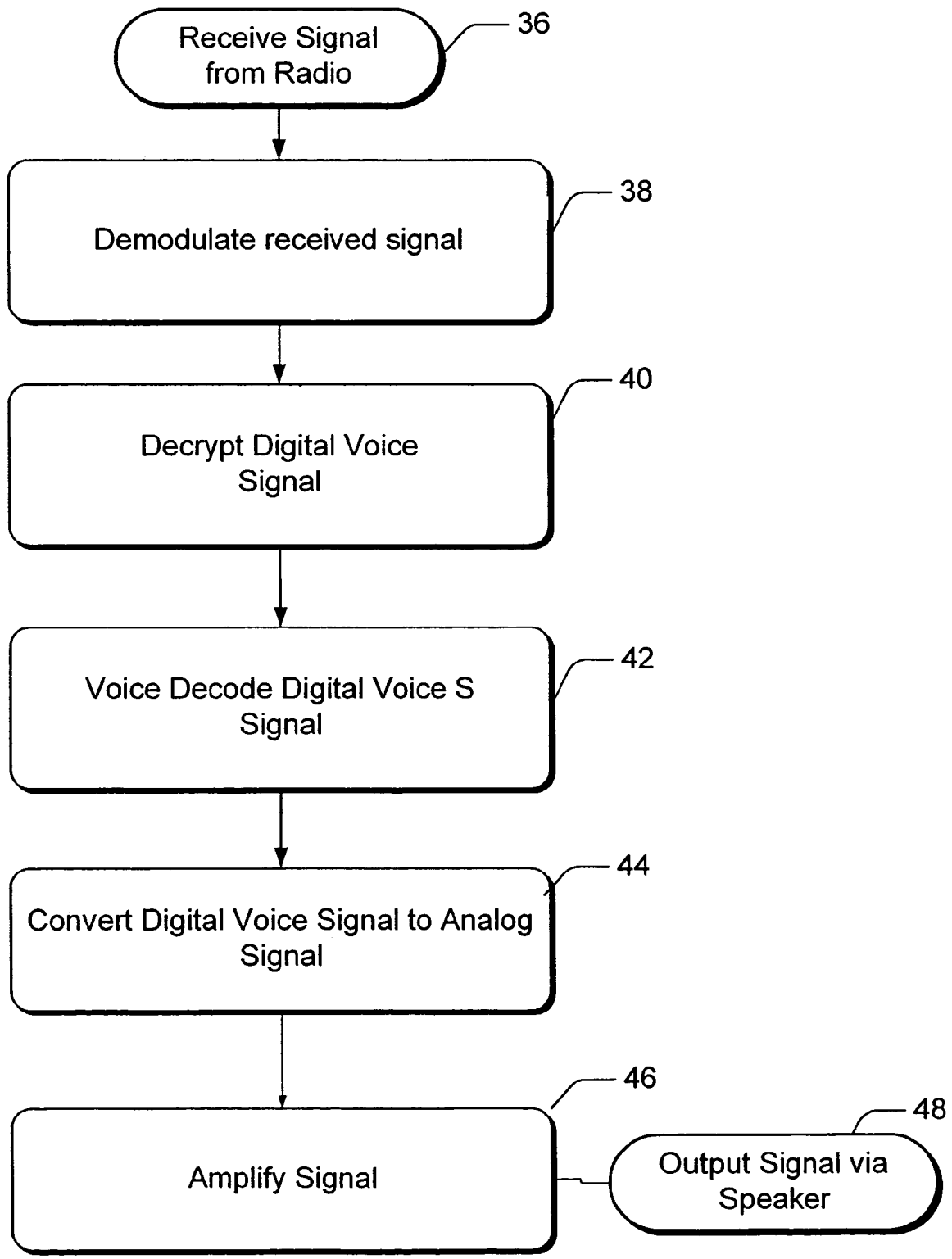
FIG. 3b is a flow diagram illustrating the method of receiving secure communications in accordance with the present invention.

FIGS. 2b and 3b are flow charts illustrating the two distinct processes performed by a microphone unit in accordance with the present invention. FIG. 2b depicts the steps performed on a voice input during the outgoing, or transmission, phase. FIG. 3b depicts the steps performed on a signal received from an analog radio during the incoming, or reception, phase.

Referring to FIGS. 2a and 2b, the transmission phase performed by the microphone unit 12 in accordance with the present invention begins with the user speaking into the microphone unit 12 (step 22). The microphone unit 12 includes a microphone 21. The microphone 21 is used to receive the voice signal from the user. The microphone 21 comprises any standard, commercially available microphone, of which many are well known in the art.

The user input is converted by the microphone 21 from an audible voice signal into a analog voice signal, which is output from the microphone 21. The analog voice signal is then amplified by an amplifier circuit 23 (step 24). Amplification of an analog signal is a well known process that is accomplished using any number of amplification circuits. The amplified analog voice signal is next converted to a digital voice signal (step 26). The conversion from an analog to a digital signal is accomplished using an analog to digital (A/D) converter 25. Standard A/D converters exist which convert analog signals into digital signals. A/D converters are widely available and well known in the art.

Once the input signal has been converted into a digital voice signal, it is processed using a vocoder 27 to transform the digital voice signal into a voice coded digitized voice signal (step 28). Vocoder devices perform a process known as voice coding whereby digitized voice signals are compressed into lower data rate signals representative of the voice input. Typical digital voice signals require between 64 kilobits/second and 128 kilobits/second. These relatively high data rates, however, are not conducive to efficient digital transmission. Vocoders use a series of digital filters that model the human vocal tract in order to create digital representations of digital voice signals at a significantly lower data rate. For example, typical vocoder outputs require only between 2.4 kilobits/second and 4.8 kilobits/second. In a preferred embodiment, a multiband exciter vocoder is used, such as the AMBE+ advanced multiband exciter vocoder licensed by Digital Voice Systems, Inc. of Westford, Mass.

The vocoded signal output by the vocoder 27 is encrypted (step 30). Many types of encryption standards exist. Advanced Encryption Standard (AES) is widely used currently in public safety applications. Thus, in a preferred embodiment, AES encryption is employed. However, it is understood that other known encryptions standards (e.g. DES, Triple DES) or any future developed encryption standards could also be used. In a preferred embodiment, the encryption is performed using software programmed into an encryption module 29 which applies an encryption algorithm to the vocoded signal. The encryption module on which the software operates comprises a digital processors such as, but not limited to, a digital signal processor, a micro processor, a programmed general purpose computer, etc. It also is possible that part or all of the functions of the encryption module may be implemented by analog circuitry.

One problem encountered in encrypted radio systems is that once a unit with the encryption capabilities is lost or stolen, the security of the system is compromised. For example, should an individual obtain a microphone unit in accordance with the present invention, he or she would be able to intercept and understand communications that were intended to be secure. Thus, it is important to be able to alter the encryption code or "key" in order to ensure that unauthorized units that might have been lost or stolen are no longer able to understand the communications being sent on the system. By using a software "key" stored in a memory 31 within the encryption module 29, it is possible to easily and efficiently change the encryption "key" without requiring the units to be removed from the field to do so. For example, the microphone unit in accordance with the present invention can be equipped with a keypad through which the user can manually reprogram the "key" by entering a new "key" that has been provided to all authorized users. Alternatively, the microphone units could be automatically reprogrammed by broadcasting a new "key" from a base station within the system. Reprogramming the "key" in this manner is fully disclosed in co-pending patent applications entitled Secure Group Secret Distribution (Ser. No. 10/280,354) and Secure Encryption Key Distribution (Ser. No. 10/228,747), which are incorporated herein by reference. An example of reprogramming the "key" in this manner is to instruct authorized recipients of the new key to tune to a particular channel at a particular time to receive the new "key" transmission, while the users of the unauthorized units would not know where or when to tune and thus would not receive the new "key."

Once the vocoded voice signal has been encrypted, it is modulated (step 32) onto a carrier signal to create an analog output that can be supplied to a standard analog radio. The analog output from the microphone unit 12 is the same type of signal normally receive from a prior art microphone by the analog radio. Well known modulation circuitry, preferably embodied in a modulator integrated circuit 33, is used to perform the modulation process. The modulated output signal can now be supplied to any standard analog radio (step 34) via the microphone input jack standard on most radios, or alternatively, by hardwiring the microphone unit 12 in accordance with the present invention in place of the microphone of the existing radio. In either case, minimal or no modifications are necessary to use existing radios to send encrypted transmissions.

In order to complete the communication cycle, the encrypted transmission must be received by a user operating a radio with the ability to decrypt the transmitted signal. This process can be performed by any standard analog radio operating in conjunction with a microphone unit in accordance with the present invention.

Referring to FIGS. 3a and 3b, the reception phase of a communication is illustrated. The encrypted signal is received as an analog radio signal by a standard analog radio (step 36). This encrypted signal is output from the radio in the same manner that the radio would normally output an unencrypted signal to a speaker unit (e.g., the small speaker contained in a prior art microphone unit worn on the shoulder of a police office in the configuration as illustrated in FIG. 1). The encrypted analog signal is received by the microphone unit 12 and demodulated (step 38) using well known demodulation circuitry, preferably embodied in an integrated circuit 37. The demodulation process removes the encrypted digital signal from the analog carrier signal.

Once the signal has been demodulated, the resulting signal comprises an encrypted digital signal, or an encrypted stream of bits. This encrypted bit stream needs to be decrypted. The decryption process (step 40) is performed on the signal by the decryption module 39, preferably comprising software stored within the microphone unit 12. A decryption algorithm corresponding to the selection encryption standard (e.g., DES, Triple DES, AES, etc.) is applied to the bit stream to remove the encryption, using a security "key" maintained in memory 41 contained within the decryption module 39. The resulting signal is a voice coded, or vocoded, signal representative of vocoded input signal prior to encryption and transmission.

The vocoded signal is applied to a voice decoder 43, preferably contained in the same vocoder chip used for signal compression during the transmission stage, for expansion into a digital signal representative of the digital voice signal created by the input microphone unit (step 42).

At this point, the digital signal can be converted to an analog signal using a digital to analog (D/A) converter 45 (step 44). The resulting analog signal is a voice signal, which is then amplified (step 46) using an amplifier circuit 47 and supplied to a speaker 49 for output as an audible signal to the user (step 48).

By using microphone units in accordance with the present invention, encryption can be added to standard analog radio systems. This eliminates the need for replacing existing radios with new encryption enabled radios or for retrofitting existing radios by installing encryption hardware into the radio unit. Only the microphone unit needs to be replaced. In addition, "end to end" encryption is provided by the present invention. This means the signal remains encrypted, and thus protected from unauthorized interception, from the point of transmission by a first user to the point of reception by a second user. Often radio systems contain several intermediary stages between the first user transmitting a signal and the second user receiving the signal. For instance, the signal may be relayed by a base station or one or more mobile repeater units operating in the system. These intermediary units allow the operating range of a radio system to be extended far beyond the range of any individual radio. Because the encrypted signal transmitted by a radio operating in conjunction with a microphone in accordance with the present invention appears to the intermediary units as a standard analog radio signal, the intermediary units can amplify and relay the transmission without ever needing to decrypt the signal. Thus, the signal remains encrypted from its initial origination point until it reaches its final intended destination.

In a preferred embodiment, the microphone unit in accordance with the present invention will allow the user to manually select between an encrypted transmission, or secure, mode and an non-encrypted, or clear, mode. This allows the user to turn off the secure mode in situations where the user desires to communicate with other radios that are not equipped with the ability to receive secure mode transmissions. In a preferred embodiment, a switch is provided on the side of the microphone unit which allows the microphone unit output to be connected directly to the microphone output, thus bypassing the remaining components in the microphone unit and allowing for clear mode transmissions.

The use of the microphone units in accordance with the present invention provides an efficient, complete security system for an existing radio system. Security is obtained against individuals attempting to eavesdrop on transmissions using scanners and/or lost or stolen radios. All of these features are accomplished through the use of simple and cost-effective microphone units in accordance with the present invention. In light of the ever increasing security concerns present in the world today, the present invention provides a significant improvement to the non-secure systems of the prior art.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

The invention claimed is:

1. A microphone unit for interfacing with a two way analog radio, said microphone unit comprising:
   a microphone for receiving an audible input and converting said audible input into an analog electrical signal;
   a digitizer coupled to said microphone for creating a digital signal from said analog electrical signal;
   a voice coding device coupled to said digitizer for creating a voice coded signal from said digital signal;
   an encryption module coupled to receive said voice coding signal for encrypting said voice coded signal to generate an encrypted signal; and
   a modulator coupled to receive said encrypted signal for generating an analog output signal capable of being received by a two way analog radio; and
   a cable operatively connected to said modulator and adapted for detachable connection to said two way analog radio to provide said analog output signal to said two way analog radio.

2. The microphone unit as set forth in claim 1, further comprising an amplifier circuit coupled between said microphone and said digitizer for amplifying said electrical signal and providing said amplified electrical signal to said digitizer.

3. The microphone unit as set forth in claim 1, wherein said cable comprises a plug for connecting to a jack of said two way analog radio.

4. The microphone unit as set forth in claim 1, wherein said encryption module comprises software for encrypting said voice coded signal.

5. The microphone unit as set forth in claim 4, wherein said encryption module further comprises memory for storing an encryption key.

6. The microphone unit as set forth in claim 1, wherein said voice coding device is an AMBE+ vocoder.

7. The microphone unit as set forth in claim 1, wherein said encryption is AES encryption.

8. The microphone unit as set forth in claim 1, further comprising:
   a demodulator for receiving an output analog signal from an analog radio and demodulating said signal into a voice coded signal;
   decryption means coupled to said demodulator for decrypting said voice coded signal to generate a decrypted voice coded signal;
   a voice decoding device coupled to said decryption means for generating a digital voice signal from said decrypted voice coded signal;
   a digital to analog converter coupled to said voice decoding device for converting said digital voice signal to an analog voice signal; and
   a speaker coupled to said digital to analog converter for outputting said analog voice signal.

9. A microphone unit for interfacing with a two way analog radio, said microphone unit comprising:
   a cable adapted for detachable connection to said two way analog radio to provide an encrypted analog signal from said two way analog radio to said microphone unit;

a demodulator for receiving said encrypted analog signal from said analog radio and demodulating said signal into a digital voice coded signal;

decryption means coupled to said demodulator for decrypting said voice coded signal to generate an decrypted voice coded signal;

a voice decoding device coupled to said decryption means for generating a digital voice signal from said decrypted voice coded signal; and a digital to analog converter coupled to said voice decoding device for converting said digital voice signal to said analog electrical signal; and a speaker for converting said analog electrical signal to an audio signal.

10. The microphone unit as set forth in claim 9, further comprising an amplifier circuit coupled between said digital to analog converter and said speaker for amplifying said analog electrical signal and providing said amplified signal to said speaker.

11. The microphone unit as set forth in claim 9, wherein said cable comprises a plug for connecting to a jack of said two way radio.

12. A microphone unit as set forth in claim 9, wherein said decryption module comprises software for decrypting said voice coded signal.

13. A microphone unit as set forth in claim 9, wherein said decryption module further comprises memory for storing an decryption key.

14. The microphone unit as set forth in claim 9, wherein said voice decoding device is an AMBE+ vocoder.

15. The microphone unit as set forth in claim 9, wherein said decryption is AES decryption.

16. A method for providing a secure audio signal input to a two way analog radio, comprising the steps of:
providing a voice input to a microphone contained within a microphone unit to create an analog electrical signal;
digitizing said analog electrical signal within said microphone unit to create a digital voice signal;
voice coding said digital voice signal to create a voice coded signal;
encrypting said voice coded signal to create an encrypted signal; and
modulating said encrypted signal to create an analog output signal;
connecting the microphone unit to said two way analog radio using a detachable cable;
providing the analog output signal to the two way analog radio via the cable; and
wirelessly transmitting an analog output broadcast signal.

17. A method as set forth in claim 16, further comprising the step of:
amplifying said analog electrical signal before said digitizing step.

18. A method for receiving a secure analog signal from a two way analog radio and converting said signal into audible speech, comprising the steps of:
connecting the microphone unit to an interface on said two way analog radio using a detachable cable;
wirelessly receiving a secure analog broadcast signal;
providing the secure analog signal from the two way analog radio via the cable;
demodulating said secure analog signal from said analog radio to create an encrypted voice coded signal;
decrypting said encrypted voice coded signal to create a digital voice coded signal;
voice decoding said digital voice coded signal to create a decoded voice signal;
converting said decoded voice signal to an analog voice signal; and
converting said analog voice signal to an audio signal via a speaker.

19. A method as set forth in claim 14, further comprising the step of:
amplifying said analog voice signal prior to outputting via said speaker.

20. A method for secure communication among analog two way radios comprising the steps of:
providing a voice input to a microphone contained within a microphone unit to create an analog electrical signal;
digitizing said analog electrical signal within said microphone unit to create a digital voice signal;
voice coding said digital voice signal to create a voice coded signal;
encrypting said voice coded signal to create an encrypted signal;
modulating said encrypted signal to create a first analog output signal, wherein said first analog output signal can be received by a two way radio via a microphone input contained within said radio;
connecting the microphone unit to an interface on said first two way analog radio using a detachable cable;
providing said analog output signal to a first two way analog radio via the cable;
transmitting an analog broadcast signal by said first two way radio;
connecting a second microphone unit to an interface on said second two way analog radio using a second detachable cable;
receiving said broadcast signal by a second two way radio and outputting a second analog output signal representative of said broadcast signal;
providing said second analog output signal from the second two way analog radio to a second microphone unit via the second cable;
demodulating said second output signal to create an encrypted voice coded signal;
decrypting said encrypted voice coded signal to create a digital voice coded signal;
voice decoding said digital voice coded signal to create a decoded voice signal;
converting said decoded voice signal to an analog voice signal; and
converting said analog voice signal to an audio signal via a speaker.

21. The microphone unit as set forth in claim 1, further comprising said two way analog radio detachably connected to said cable.

22. The microphone unit as set forth in claim 9, further comprising said two way analog radio detachably connected to said cable.

* * * * *